United States Patent Office 3,126,174
Patented Mar. 24, 1964

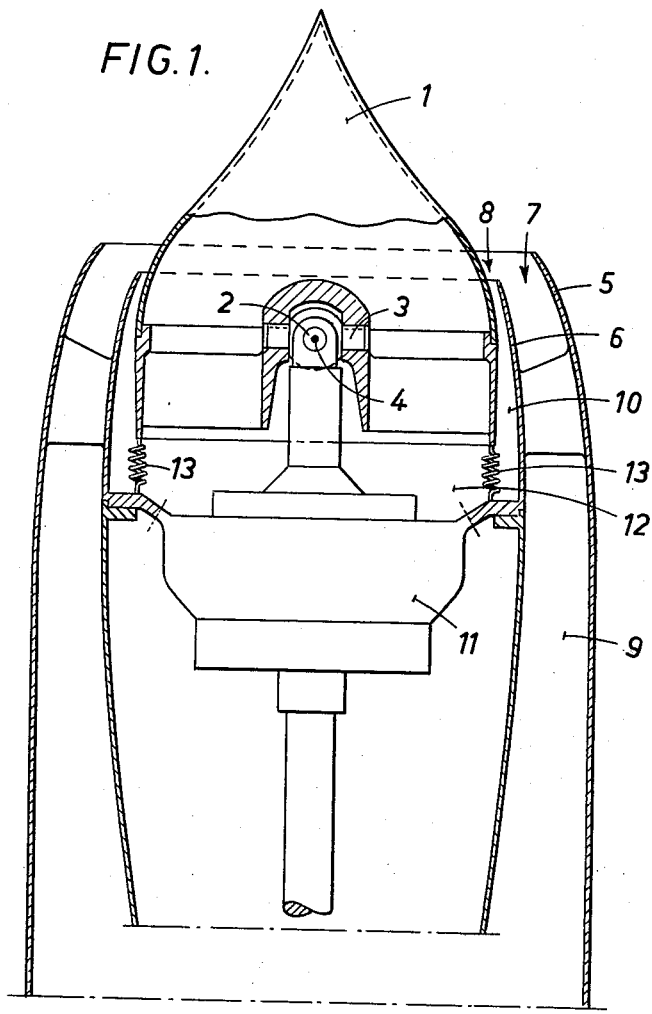

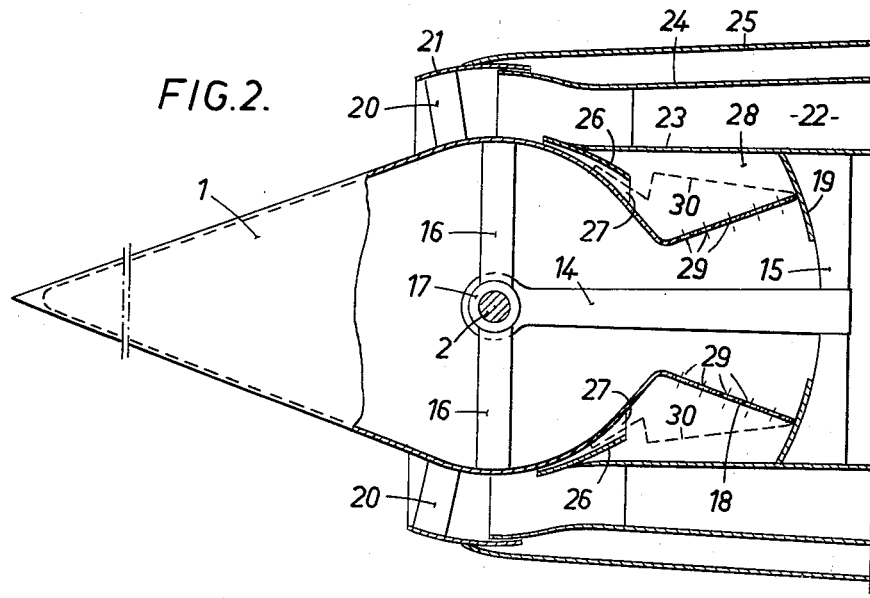
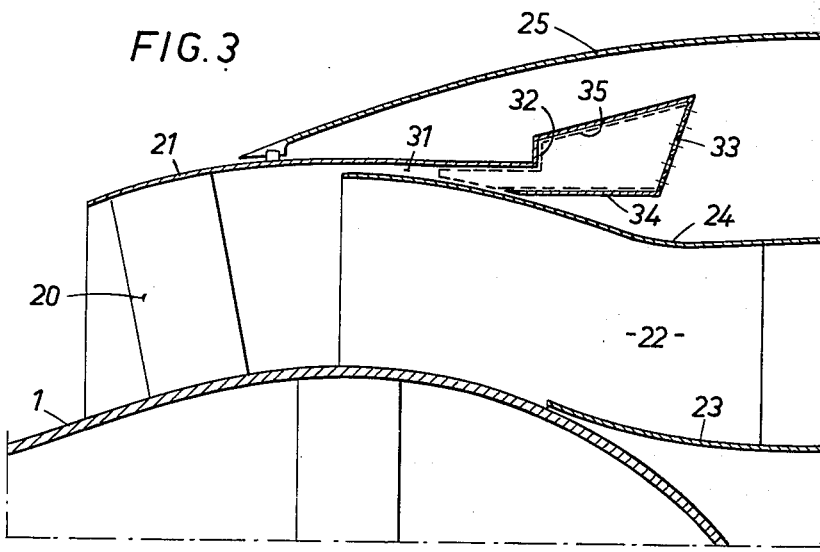

3,126,174
AIR INLET MECHANISM FOR SUPERSONIC AIRCRAFTS
Karl-Axel Zetterström, Onderlaieggatan 30, Trollhattan, and Per-Olof Wennergren, Barkarby, near Stockholm, Sweden
Filed May 29, 1961, Ser. No. 113,344
9 Claims. (Cl. 244—53)

The present invention relates to aircraft travelling at supersonic speed, and more particularly to aircraft using ramjet engines.

An object of the invention is to avoid or decrease the reduction of the efficiency of such engines which is due to the rammed air entering the air inlet of the aircraft in an oblique direction.

Another object of the invention is to provide simple and reliable means for effecting an automatic adjustment of the forward section of the aircraft including the nose portion and the air inlet, with a view to setting said member or members into a position in which the longitudinal axis of said member or members is substantially parallel with the direction of flow of the air rammed by the aircraft, and/or in which the air inlet takes up a position in a plane substantially at right angles to said direction.

To this end the nose portion of the aircraft and/or a mouth piece of the air inlet are mounted to turn about one or more axes with relation to the fuselage of the aircraft and are connected with means which develop, under the control of the rammed air, a sufficient power for setting said nose and/or said mouth piece into positions in which the longitudinal axis of the nose is substantially parallel with the direction of flow of the rammed air with relation to the longitudinal axis of the fuselage and/or in which the plane of the mouth piece opening forms right angles with said direction.

Another feature of the invention resides in the movably mounted nose portion of the aircraft and the mouth piece of the air inlet are rigidly connected together so as to turn as a unit about said axis or axes, one of said members, viz. the nose portion or the mouth piece of the air inlet, having means connected thereto for performing the automatic setting of said members.

According to a further feature of the invention said setting means comprises a mantle-shaped member providing a passage between itself and the external surface of the nose portion or between itself and the internal surface of the mouth piece of the air inlet for receiving a portion of the rammed air entering the air inlet, said passage being so dimensioned and proportioned that the static air pressure as exerted therein on the nose or the air inlet mouth, respectively, will be sufficient for effecting the setting of said member.

According to a still further feature of the invention said passage is shaped as a diffuser yielding a nearly constant diffusing effect at various oblique positions, means being provided at the outlet end of the passage for throttling the outflow therefrom with a view to securing the highest setting force obtainable.

Another feature of the invention involves the provision of a servomechanism for effecting the setting of the nose portion of the aircraft or the air inlet mouth piece under the control of obliquely rammed air.

A further feature involves that the nose portion of the aircraft and the mouth piece of the air inlet are settable independently of each other and each provided or combined with means for effecting an automatic setting under the control of obliquely rammed air.

In the accompanying drawings various embodiments of the invention are shown by way of example. FIG. 1 is a longitudinal section of the forward portion of the fuselage of an aircraft designed for travelling at supersonic speed. FIG. 2 is a longtiudinal section of the forward portion of a fuselage having a movably mounted nose portion and a likewise movably mounted air inlet mouth piece rigidly connected together, automatic setting means being combined with the nose portion. FIG. 3 shows a detail of a longitudinal section of part of a movable nose portion and a likewise movable air inlet mouth piece rigidly connected together, automatic setting means being combined with the mouth piece.

With reference to FIG. 1, the numeral 1 designates the cone-shaped nose portion of the fuselage of an aircraft using a ramjet engine, not shown. By means of two shafts 2 and 3 forming right angles with each other the nose 1 is mounted to rotate in all directions about a point 4 stationary with relation to the fuselage. The external mantle wall 5 of the fuselage ends at a distance from the tip of the nose so as to form an annular inlet for the air rammed by the nose. The space between said external wall 5 and the rear portion of the nose is divided by an annular baffle 6 into an outer passage 7 and an inner passage 8 both of annular cross section for receiving the rammed air. The outer passage 7 is traversed by the main portion of said air for passing it to the combustion chamber (not shown) of the ramjet engine. The inner passage 8 has a comparatively small inlet area of passage so that it receives substantially only the boundary layer of air passing along the surface of the nose cone in direct contact therewith. As said boundary layer is turbulent it is of advantage to thus remove it from the main airflow entering the passage 7. The inlet passages 7 and 8 are continued rearwardly by expanding passages 9 and 10, respectively.

Both of said passages 7, 9 and 8, 10, respectively, are formed and act as sub-critical diffusers. The rammed, and thus compressed air entering passage 10 may be used for driving various mechanical means required for the correct operation of the aircraft which are positioned inside a casing 11 behind the cone-shaped nose, and/or for cooling the walls of the combustion chamber.

The pressure inside the space 12 between the central nose 1 and said casing 11 is controlled like the pressure behind passage 9 so that the flow in the essential portion of passage 10 will be of sub-critical character like that in passage 9.

By suitably positioning the centre of rotation 4 of the nose 1 and by appropriately shaping the external surface of the nose as well as the internal surface of the inner mantle wall 6 a stable automatic setting of the nose under the action of the dynamic forces as exerted thereon by the rammed air may be secured. In order normally to hold the nose in a symmetric position with relation to the fuselage springs 13 are inserted between the rear end of the nose and appropriate members of the fuselage.

In the embodiment shown in FIG. 2 the nose 1 for the sake of simplicity is shown as mounted to turn about a single shaft 2 but may, of course, be movable about two shafts at right angles to each other, or generally, about a point fixed with relation to the fuselage, corresponding to point 4 of the embodiment above described.

It is to be noted that, in the embodiment of FIG. 2 as well as in the other embodiment to be hereinafter described, and in which the nose member is assumed to be turnable about a single axis, the nose member may, if desired, be wedge-shaped instead of conical. For the sake of this description, however, it is assumed that the nose member is conical in shape.

With reference to FIG. 2 the numeral 14 designates an arm for supporting a bearing for shaft 2. Said arm extends rearwardly from said bearing through the open end of the nose member and is connected at its rear end by transverse stays 15 to the fuselage. The nose member is widest along a plane through the axis of shaft 2 which is perpendicular to the longitudinal axis of the nose member. Extending along said plane are stays 16 for connecting the hollow nose member to a hub 17 on shaft 2. Behind said plane the nose member is reduced in width substantially along a part spherical surface to a point of smallest width from which the width again increases rearwardly by a conical end portion 18. This portion 18 ends at a slight distance from an annular baffle 19 belonging to the fuselage, which is curved to accommodate to the path of movement of the rear end of member 18.

The front portion of the nose member is connected at points adjacent its widest portion by means of preferably radial stays 20 to an annular shield 21 concentrically surrounding the respective portion of the nose member. Between itself and the external surface of the nose member the annular shield 21, hereinafter referred to as air inlet lip, forms an inlet for air rammed by the nose during the travel of the aircraft. Said air inlet leads to a passage 22 leading to the combustion chamber (not shown) of the ramjet engine. The passage 22 is bounded inwardly by a mantle wall 23 and outwardly by a mantle wall 24. The external shell of the fuselage is designated by 25. The air inlet lip 21 surrounds by its rear portion the correspondingly shaped front portion of the outer wall 24 of passage 22 so as not to be interfered thereby when turning with the nose member about shaft 2. Bearing against the external surface of the lip 21 by means of a suitable packing member is the front end of shell 25.

Surrounding the curved rear portion of the nose member is a shield 26 forming between itself and the curved nose portion a rearwardly widening passage 27 shaped as a sub-critical diffuser of such a geometrical shape that the static pressure as exerted upon the nose member by the rammed air entering the passage 27 during the flight of the aircraft at supersonic speed may give rise to a sufficient force for causing the nose when the rammed air strikes the nose in an oblique direction to take up a position in which the longitudinal axis of the nose coincides or nearly coincides with the direction of flow of the rammed air with relation to the longitudinal axis of the fuselage.

At this setting operation the air inlet lip 21 partakes in the movement of the nose with the result that the air inlet will always remain in a symmetrical position with relation to the nose, as is shown in FIG. 2.

The diffuser passage 27 opens into a chamber 28 bounded inwardly by the rear portion 18 of the nose member, outwardly by the inner mantle wall 23 of passage 22 and rearwardly by the baffle 19. By openings 29 in the rear nose portion 18 the chamber 28 communicates with the interior of the nose member and through the central opening of the annular baffle 19 with the interior of the fuselage. By the throttling effect thus caused in space 28 the highest pressure possible may be obtained for performing the setting operation hereinbefore described.

In case of a nose member and associated air inlet lip turnable in all directions the diffuser formed by the passage 27 and the associated air chamber 28 may be provided with a set of guide vanes, as indicated at 30, acting to prevent a peripheral flow of air, so as thereby to maintain a sufficient static difference in pressure at oblique ramming for securing an automatic setting operation. There is effected a balancing of the forces as resulting from two different areas of pressure, viz. on the one hand the surface of the cone extending from the point of the cone to the turning point and, on the other hand, the surface of the rear portion of the cone, which is loaded by a super pressure resulting from the diffusion of the flow of air taking place in the passage 27, FIG. 2.

The embodiment indicated in FIG. 3 differs from that just described essentially only by the feature that the setting power is exerted on the air inlet lip instead of on the nose member.

In FIG. 3 like reference numerals are used as in FIG. 2 for indicating equivalent elements.

In FIG. 3 an air passage 31 acting as a diffuser is formed between the internal surface of the air inlet lip 21 and the outer wall 24 of air passage 22. Said diffuser passage 18 is adapted to receive a portion of the rammed air entering the inlet bounded outwardly by means of lip 21. The dynamic power as exerted within said passage 31 on lip 21 has for its object to cause said lip and the nose member rigidly connected thereto to move about their axis of movement, corresponding to axis 2 in FIG. 2, so as to adjust them in the direction of movement of the air rammed by the nose member.

The diffuser passage 31 is widened by a step at 32 in order that a nearly constant diffusing effect may be obtained even when the air is rammed under large oblique angles. In order to secure the highest pressure possible the rear end of the widened extension of passage 31 is provided with a perforate rear end wall 33 formed integrally with lip 21 and an inner wall 34 of said widened portion. Said inner wall 34 ends at a slight distance from the outer wall 24 of passage 22 where appropriate sealing means may be used, if desired. In the operation of the embodiment according to FIG. 3 a balancing of forces is attained similar to that described in connection with FIG. 2. Here, the super pressure area is located on the air inlet lip rigidly connected to the cone.

In case of a universally turnable nose member guide vanes may be provided in passage 31 and the widened extension thereof, as indicated at 35.

It is to be noted that modifications may be made without departing from the principle or scope of the invention.

As already stated hereinbefore, the shape of the nose member may be different from that of a cone.

We claim:

1. In an adjustable air inlet device for supersonic aircraft, the combination with the fuselage of the aircraft of a conical nose member and an air inlet guide member, each of which is mounted to turn about an axis with relation to the fuselage, an annular chamber including a movable wall member coaxial with said nose member and rigidly connected thereto, and a passage leading from the rammed air inlet to said chamber for passing rammed air of different speeds to various points of the circumference of said chamber according to the position of the longitudinal axis of said nose member with relation to the direction of the flow of the air in the atmosphere surrounding the aircraft, so as thereby to subject the movable wall member to different dynamic pressures at different points of its circumference with a view to cause it to turn said nose member about its axis until the dynamic pressure is equalized around the entire circumference of the chamber.

2. In an adjustable air inlet device for supersonic aircraft as claimed in claim 1, in which the nose member and the air inlet lip are rigidly connected together so as to turn as a whole about said axis or axes, the further feature that the movable wall member of said annular chamber forms an integral part of said nose member.

3. In an adjustable air inlet device for supersonic aircraft as claimed in claim 1, and in which the nose member and the air inlet lip are rigidly connected together, the further feature that the movable wall member of said annular chamber is rigidly connected to the air inlet lip.

4. In an adjustable air inlet device for supersonic aircraft as claimed in claim 1, the further feature that the air passage leading to the annular chamber is formed as a diffuser.

5. In an adjustable air inlet device for supersonic aircraft as claimed in claim 1, and in which the air passage leading to the annular chamber comprises a diffuser, the further feature that said diffuser is so shaped as to have a substantially constant diffusing effect at various oblique positions of the nose and the air inlet lip with relation to the longitudinal axis of the aircraft, the passage being provided with throttling means at its outlet and with a view to yielding the highest pressure and thus the highest adjusting power possible.

6. In an adjustable air inlet device for supersonic aircraft as claimed in claim 2, the further feature that said annular chamber and the air passage leading thereto are formed between the surface of said nose member and surrounding wall members rigidly connected to the aircraft fuselage.

7. In an adjustable air inlet device for supersonic aircraft as claimed in claim 1, and in which the movable wall member of the annular chamber is rigidly connected to the air inlet lip, the further feature that the air passage leading to said chamber is provided between an inner surface of the air inlet lip and a wall member rigidly connected to the fuselage and forming the outer wall of a passage for leading the main portion of the rammed air to the motor of the aircraft.

8. In an adjustable air inlet device for supersonic aircraft as claimed in claim 1, the further feature that the annular chamber and the adjacent portion of the air passage leading thereto are formed with guide vanes to act as partitions for preventing a rotational movement of the rammed air inside the chamber.

9. In an adjustable air inlet device for supersonic aircraft, the combination with the fuselage of the aircraft, of a nose member mounted to turn about an axis with relation to the fuselage, an inner and an outer wall member of the fuselage surrounding the nose member whereby said nose member and said inner wall member form a narrow annular air inlet, and an associated air passage between the inner wall member and the surface of the nose member, and a wide annular air inlet and an associated air passage outside said narrow inlet and passage between the two wall members, the inner one of said air passages forming a diffuser to subject the surface of the nose member forming the inner wall of said diffuser to a dynamic pressure varying around the circumference of the nose member according to the position of the nose member with relation to the direction of flow of the surrounding air with a view to turn the nose member about its axis until the dynamic pressure becomes equal at all points of the circumference of the nose member.

References Cited in the file of this patent
UNITED STATES PATENTS

| | | |
|---|---|---|
| 2,776,806 | Brendal | Jan. 8, 1957 |
| 2,932,945 | Brandt | Apr. 19, 1960 |
| 2,969,939 | Sulkin et al. | Jan. 31, 1961 |